US010466353B2

(12) United States Patent
Rogers et al.

(10) Patent No.: US 10,466,353 B2
(45) Date of Patent: Nov. 5, 2019

(54) UNDERWATER ACOUSTIC LEAKY WAVE ANTENNA

(71) Applicant: GOVERNMENT OF THE UNITED STATES OF AMERICA, AS REPRESENTED BY THE SECRETARY OF THE NAVY, Arlington, VA (US)

(72) Inventors: Jeffrey Rogers, Annandale, VA (US); Katherine Woolfe, Washington, DC (US); Matthew David Guild, Alexandria, VA (US); Theodore P. Martin, Springfield, VA (US); Christina Jeanne Naify, Pasadena, CA (US); Charles Alan Rohde, Alexandria, VA (US)

(73) Assignee: The Government of the United States of America, as represented by the Secretary of the Navy, Washington, DC (US)

( * ) Notice: Subject to any disclaimer, the term of this patent is extended or adjusted under 35 U.S.C. 154(b) by 307 days.

(21) Appl. No.: 15/711,178

(22) Filed: Sep. 21, 2017

(65) Prior Publication Data

US 2019/0086536 A1 Mar. 21, 2019

(51) Int. Cl.
| G01S 15/74 | (2006.01) |
| G01S 5/30 | (2006.01) |
| G01S 5/28 | (2006.01) |
| H01Q 13/20 | (2006.01) |
| H04B 1/02 | (2006.01) |
| H04B 13/02 | (2006.01) |

(52) U.S. Cl.
CPC ............... *G01S 15/74* (2013.01); *G01S 5/28* (2013.01); *G01S 5/30* (2013.01); *H01Q 13/20* (2013.01); *H04B 1/02* (2013.01); *H04B 13/02* (2013.01)

(58) Field of Classification Search
CPC ... G01S 15/74; G01S 5/30; G01S 5/28; G01S 3/808; G01S 7/523; H04B 1/02; H04B 13/02; H01Q 13/20; H01Q 1/04; H01Q 13/203; H01Q 21/061
See application file for complete search history.

(56) References Cited

U.S. PATENT DOCUMENTS

| 6,164,179 A | 12/2000 | Buffman | |
| 2011/0077513 A1* | 3/2011 | Rofougaran | ........ G06F 19/3418 600/437 |

(Continued)

OTHER PUBLICATIONS

Esfahlani et al., "Acoustic dispersive prism", Scientific Reports Aug. 23, 2017, 29 pages.

(Continued)

*Primary Examiner* — Daniel Pihulic
(74) *Attorney, Agent, or Firm* — US Naval Research Laboratory; Suresh Koshy

(57) ABSTRACT

A leaky-wave antenna for fluid environments includes a waveguide cavity defined by a waveguide wall. The waveguide cavity is filled with a waveguide fluid. The waveguide walls are made of either an anisotropic material that utilize one of orthotropic stiffness of the anisotropic material to control mode conversion, a band gap material to approximate an acoustically rigid boundary, and a combination of the two materials.

25 Claims, 11 Drawing Sheets

(56) References Cited

U.S. PATENT DOCUMENTS

2017/0059707 A1* 3/2017 Rohde .................. A61B 8/12
2019/0086536 A1* 3/2019 Rogers ................. G01S 15/74

OTHER PUBLICATIONS

Bongard et al., "Acoustic transmission line metamaterial with negative/zero/positive refractive index", 2010, The American Physical Society, 11 pages.
Naify et al., "Evaluation of the resolution of a metamatertal acoustic leaky wave antenna",The Journal of the Acoustical Society of America, vol. 139, No. 6, Jun. 2016, 8 pages.
Naify et al., "Experimental realization of a variable index transmission line metamaterial as an acoustic leaky-wave antenna", Applied Physics Letters, downloaded Sep. 4, 2013, 5 pages.
Naify et al., "Generation of topologically diverse acoustic vortex beams using a compact metamaterial aperture", Applied Physics Letters, downloaded Aug. 1, 2016. 5 pages.
"Metamaterial", Wikipedia, Aug. 23, 2017, 16 pages.
Bacigalupo et al., "Optimal design of low-frequency band gaps in anti-tetrachiral lattice meta-materials", Aug. 2, 2016, 10 pages.
Chen et al., International Journal of Solids and Structures 0 (2013) 996-1004 "Elasticity of anti-tetrachiral anisotropic lattices".
Wu et al., ACS Appl. Mater Interfaces 2016, 8, 17721-17727 "Isotropic Negative Thermal Expansion Metamaterials."
Mousanezhad et al., Theoretical and Applied Mechanics Letters 6 (2016) 81-96 "Elastic Properties of chiral, anti-chiral, and hierarchical honeycombs: A simple energy based approach."
Lai et al., Nature Materials 10, 620 (2011) Hybrid Elastic Solids.
Shan et al., "Facial expression recognition based on Local Binary Patterns", Image and Vision Computing, 2009, 14 pages.

* cited by examiner

Angular Momentum States $L$

UNDERWATER ACOUSTIC LEAKY WAVE ANTENNA

CROSS-REFERENCE TO RELATED APPLICATIONS

This application claims priority to U.S. Provisional Patent Application No. 62/397,515 filed on Sep. 21, 2016, the complete disclosure of which, in its entirety, is herein incorporated by reference.

U.S. Patent Publication No. 20170059707, "Miniature Acoustic Leaky-Wave Antenna for Ultrasonic Imaging," filed Aug. 25, 2016, incorporated herein by reference, discloses a miniature acoustic leaky-wave antenna for ultrasonic imaging.

U.S. Patent Application No. 62/538,933 Methods of Geometric Alteration to Enable Acousto-elastic Metamaterial Functionality within Anti-tetrachiral Lattice Geometries filed Jul. 31, 2017, incorporated herein by reference, discloses an acoustic metamaterial.

BACKGROUND

The present disclosure relates to acoustic antennas for projection and sensing applications. It finds particular application in conjunction with a leaky wave antenna (LWA), also known as an acoustic prism, in an underwater environment, and will be described with particular reference thereto. However, it is to be appreciated that the present exemplary embodiment is also amenable to other like applications.

Multi-element linear, also called phased, arrays of transducer elements, like those used in ultrasonic imaging devices, may have high processing bandwidth (typically greater than 100 GHz) requirements, and require high power and complex processing capabilities. LWAs generally utilize a single acoustic source in combination with apertures, replacing the need for an array of sources/sensors. The use of a LWA significantly reduces power requirements when compared to prior art array devices. However, while LWAs are known in the art, they are almost always limited to an air environment due to the acoustically rigid boundaries between the LWA waveguide material and surrounding air and when introduced in a water environment the waveguide walls appear acoustically elastic.

In general, LWA have a single active element at one end of the waveguide and includes periodically spaced slits also called shunts. Radiated power leaks out of the shunts at an angle coupled to the input frequency as the wave travels down the waveguide.

A water environment, having a much higher density and bulk modulus, presents a challenge for LWAs. Specifically, the acoustical impedance of water is approximately 5000 times that of air. Thus, the impedance of the radiating medium (water) is similar to that of conventional LWA waveguide walls. The similarity makes the walls appear acoustically non-rigid (elastic) to the radiating medium. The acoustic elasticity allows for the undesired leakage of sound and results in poor performance of a LWA. The acoustically non-rigid walls may lead to uncontrollable coupling into elastic wall polarizations.

It is desirable to provide a single antenna to replace sensor arrays for use in a fluid environment that accounts for the impedance of the fluid medium and mitigates the elastic waves in the wall and controls leakage.

BRIEF DESCRIPTION

The disclosure is directed to leaky wave antennas for use underwater. One goal of which is to enable directional beam-forming for both acoustic projection and sensing applications.

According to an exemplary embodiment, disclosed herein is a leaky-wave antenna system including an acoustic leaky-wave antenna (LWA). The LWA including a first and second end and a waveguide cavity having at least one wall that defines a waveguide volume. The at least one wall includes at least one of an anisotropic material and an acoustic band gap material. The acoustic band gap material is configured to approximate an acoustically rigid boundary in a fluid environment and the anisotropic material is configured to an orthotropic stiffness to control a mode conversion of an input acoustic wave signal. The LWA system also includes a transducer disposed at one of the first and second end and is operationally coupled to the acoustic leaky-wave antenna.

According to another exemplary embodiment, the acoustic leaky-wave antenna of the system further includes a waveguide fluid that fills the waveguide volume. The waveguide fluid may be water.

According to another exemplary embodiment, the acoustic leaky-wave antenna of the system further includes a plurality of periodically structured sub-wavelength acoustic windows disposed in the waveguide wall.

According to another exemplary embodiment, the waveguide wall comprises a band gap material. In some embodiments, the band gap material, is a phononic crystal material. In some cases, the band gap material can be composed of chiral structures. The chiral structures can form an anti-tetrachiral lattice structure.

According to another exemplary embodiment, the waveguide includes a lattice of thin flexural plates inserted periodically along the length of the waveguide volume transecting the direction of wave propagation.

In other exemplary embodiments, the waveguide wall is made of at least one anisotropic material. In some embodiments, the anisotropic material can be formed by stacking isotropic materials in layers to from a superlattice.

According to another exemplary embodiment, the transducer is configured to detect reflected signals collected by the leaky wave antenna. In other embodiments, the transducer transmits a broadband acoustic wave in the fluid filled waveguide cavity.

In accordance with another aspect of the disclosure, a leaky-wave antenna is described. According to an exemplary embodiment, a leaky-wave antenna includes at least one waveguide wall that defines a waveguide cavity having a waveguide volume, the waveguide cavity adapted to be filled with a waveguide fluid, and the at least one waveguide wall includes an acoustic band gap material. The LWA also includes a plurality of periodically structured acoustic windows located on an external surface of the waveguide wall, the periodically structured acoustic windows are physical apertures in the waveguide wall extending from the external surface of the waveguide wall to the waveguide cavity.

According to another exemplary embodiment, the leaky-wave antenna further includes a waveguide fluid that fills both the waveguide cavity and plurality of acoustic windows. In some embodiments, the waveguide fluid is water. The fluid may be one of sealed in the LWA and allowed to flow and interact with a fluid medium/environment. In some embodiments, a membrane is placed over the plurality of acoustic window apertures.

According to another exemplary embodiment, the waveguide wall is an acoustic band gap material. The acoustic band gap material may be a metamaterial. According to an exemplary embodiment, the acoustic band gap material is a phononic crystal lattice. The phononic crystal lattice may be an anti-tetrachiral structure.

In accordance with another aspect of the disclosure, a leaky wave antenna includes at least one waveguide wall having a continuous external surface that defines a waveguide cavity having a waveguide volume. The waveguide cavity is adapted to be filled with a waveguide fluid, and at least one waveguide wall is made of one of an anisotropic material and metamaterial configured to an orthotropic stiffness to control a mode conversion of an acoustic wave.

According to another exemplary embodiment, the at least one waveguide wall is of a material that allows for an acoustic field leakage through orthotropic walls that are fully elastic. In some embodiments, the waveguide walls may be an anisotropic material that is a composite material. In other embodiments, the waveguide walls may be a metamaterial. In yet other embodiments, the anisotropic material is a stack of materials wherein at least one material in the stack is anisotropic. In yet other embodiments, the anisotropic material is a stack of isotropic materials creating an anisotropic stiffness tensor. The stiffness tensor of the anisotropic material is designed to optimize a beam pattern as a function of a frequency.

According to another exemplary, embodiment, the LWA is wrapped into a ring shape to form vortex waves. This LWA includes a longitudinal portion having a first end adjacent to a second end and a circular portion, where the waveguide cavity forms a circular shape.

These and other aspects of the embodiments herein will be better appreciated and understood when considered in conjunction with the following description and the accompanying drawings. It should be understood, however, that the following descriptions, while indicating preferred embodiments and numerous specific details thereof, are given by way of illustration and not of limitation. Many changes and modifications may be made within the scope of the embodiments herein without departing from the spirit thereof, and the embodiments herein include all such modifications.

BRIEF DESCRIPTION OF THE DRAWINGS

The following is a brief description of the drawings, which are presented for the purposes of illustrating the exemplary embodiments disclosed herein and not for the purposes of limiting the same.

The patent or application file contains at least one drawing executed in color. Copies of this patent or patent application publication with color drawing(s) will be provided by the Office upon request and payment of the necessary fee.

DETAILED DESCRIPTION

Figure 1:
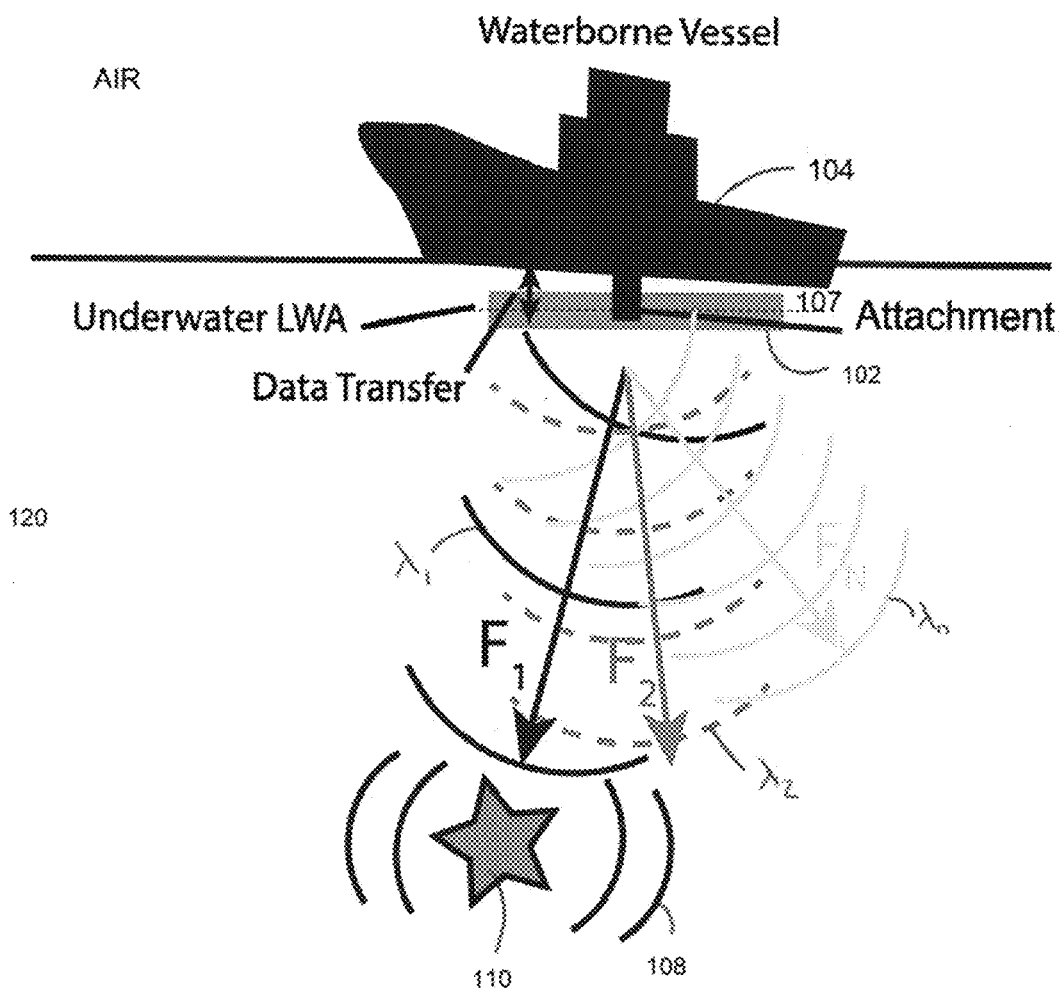
FIG. 1 illustrates an acoustic-leaky wave antenna system in accordance with the present disclosure.

A more complete understanding of the component, processes, apparatuses, and methods disclosed herein can be obtained by reference to the accompanying drawings. These figures are merely schematic representations based on convenience and the ease of demonstrating the present disclosure, and are, therefore, not intended to indicate relative size and dimensions of the devices or components thereof and/or to define or limit the scope of, the exemplary embodiments.

Although specific terms are used in the following description for the sake of clarity, these terms are intended to refer only to the particular structure of the embodiments selected for illustration in the drawings, and are not intended to define or limit the scope of the disclosure. In the drawings and the following description below, it is to be understood that like numeric designations refer to components of like function.

Numerical values in the specification and claims of this application should be understood to include numerical values which are the same when reduced to the same number of significant figures and numerical values which differ from the stated value by less than the experimental error of conventional measurement technique of the type described in the present application to determine the value.

All ranges disclosed herein are inclusive of the recited endpoint and independently combinable (for example, the range of "from 2 to 10" is inclusive of the endpoints, 2 and 10, and all the intermediate values).

The term "about" can be used to include any numerical value that can vary without changing the basic function of that value. When used with a range, "about" also discloses the range defined by the absolute values of the two endpoints, e.g. "about 2 to about 4" also discloses the range "from 2 to 4," The term "about" may refer to plus or minus 10% of the indicated number.

An underlying goal is to create an acoustic leaky-wave antenna to enable directional beam-forming for both acoustic projection and sensing applications to be used in a water environment. That is, the radiated waves from the leaky-antenna, are leaked into the fluid environment/medium. LWAs may project sound from a waveguide in a directed beam, where the direction is controlled by frequency of the wave. Generally, LWAs utilize only one of a single acoustic source and sensor, depending on the application, and replace the need for an array of sources and sensors. This significantly reduces the power requirements for beam forming. In some embodiments, the LWA can create acoustic vortices, which can be used to simultaneously encode and detect multiple, orthogonal orbital angular momentum states in a single acoustic signal, leading to higher bandwidth acoustic communication.

Figure 2:
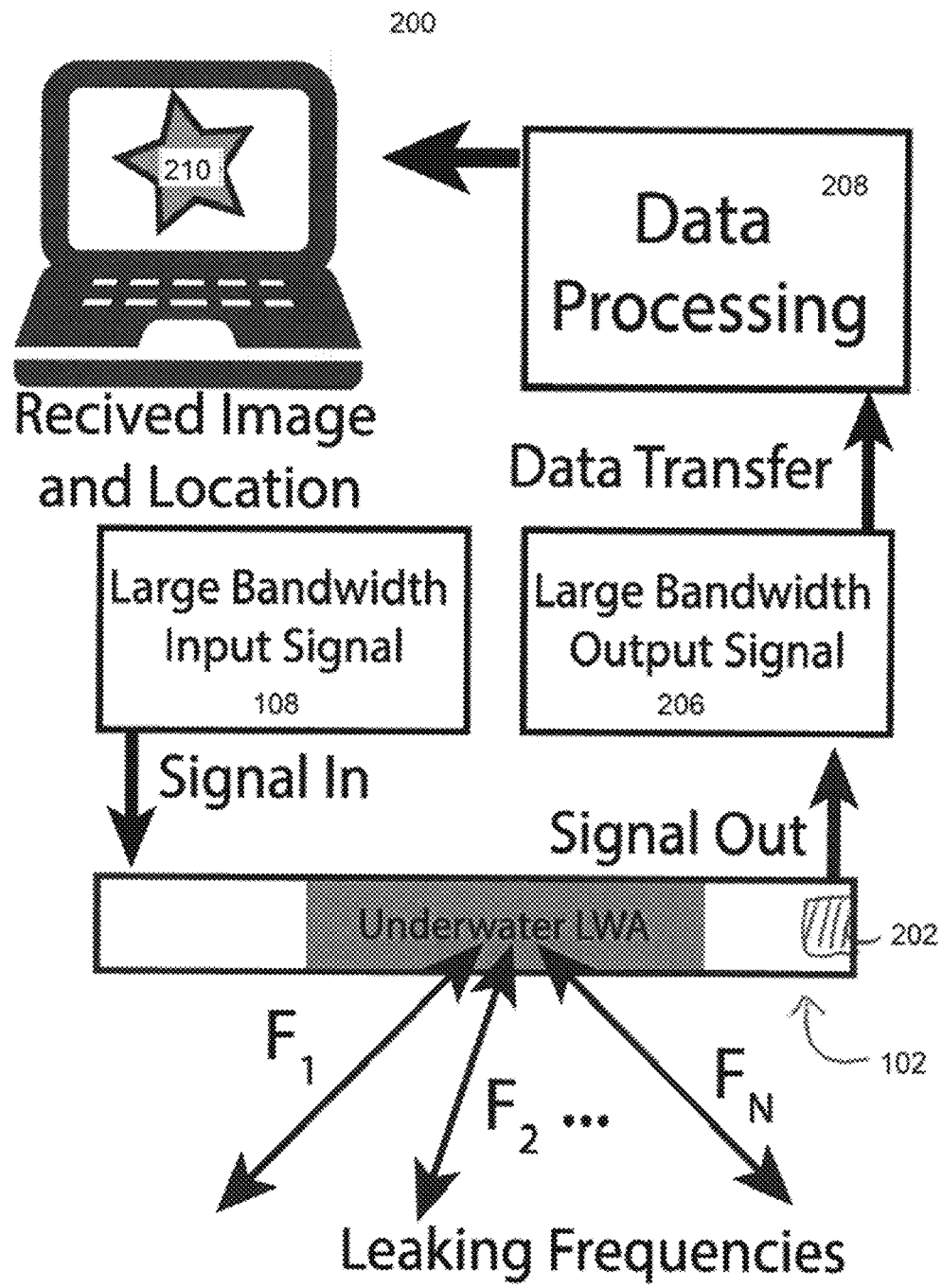
FIG. 2 illustrates a data processing system in accordance with the present disclosure.

In accordance with some aspects of the present disclosure, FIG. 1 and FIG. 2 illustrate an acoustic leaky-wave antenna system 100 and data processing system 200. Here, the LWA 102 is located in underwater environment 120. In this exemplary embodiment, the LWA 102 is attached to the bottom of a waterborne vessel 104.

In a transmitting mode, where a source is emitting sound inside the waveguide, the LWA 102 may radiate and steer sound waves $\lambda_{1...n}$ in frequency dependent directions $f_1$-$f_n$. ($f_{1...n}$). Each frequency $f_{1...n}$, is transmitted at a corresponding frequency dependent angle $\theta_{1...n}$ defined as the angle between the direction of the propagating acoustic waves $\lambda_{1...n}$ and the waveguide axis 107 parallel to the longitudinal axis of the LWA 102. According to an exemplary embodiment, the source is a transducer 202. Generally, transducers convert the detected sound into an electric signals and vice versa. Thus, in this embodiment, an acoustic wave may be propagated through the waveguide by the transducer 202.

In a receiving mode, with reference to FIG. 2 and continued reference to FIG. 1 in accordance with an exemplary embodiment, the LWA 102 is adapted to receive acoustic signals 108 that are one of transmitted and reflected by underwater object 110. In this mode, the LWA 102 may perform sound source localization by separating broadband acoustic signals 108 using only a single sensor. The LWA 102 collects one of transmitted and reflected large bandwidth input signals 108 and is detected by a transducer 202 integrated into the LWA 102. The transducer 202 is a device that converts the detected sound into n electric signals. According to an exemplary embodiment, the transducer is a microphone. In yet other exemplary embodiments, the transducer is a hydrophone. According to another exemplary embodiment, the transducer is mounted close to an end of the LWA.

According to an exemplary embodiment, a sound source is communicatively coupled to the LWA 102. The source outputs an acoustic pulse that illuminates and reflects from objects 110 that are away from the LWA 102. The reflected pulse 108 is collected by the LWA 102.

In accordance with another aspect of the present disclosure, reflected and transmitted pulses 108 are collected from the LWA and are then processed. With reference to FIG. 2, the transducer 202 of the LWA 102 transforms the collected pulse into electric datalsignals and sends the data to processing system 200. According to an exemplary embodiment, the data processing component 208 performs Fourier transform analysis on the large bandwidth output signal 206 to display an object image 210 and location of object 110.

Figure 3A:
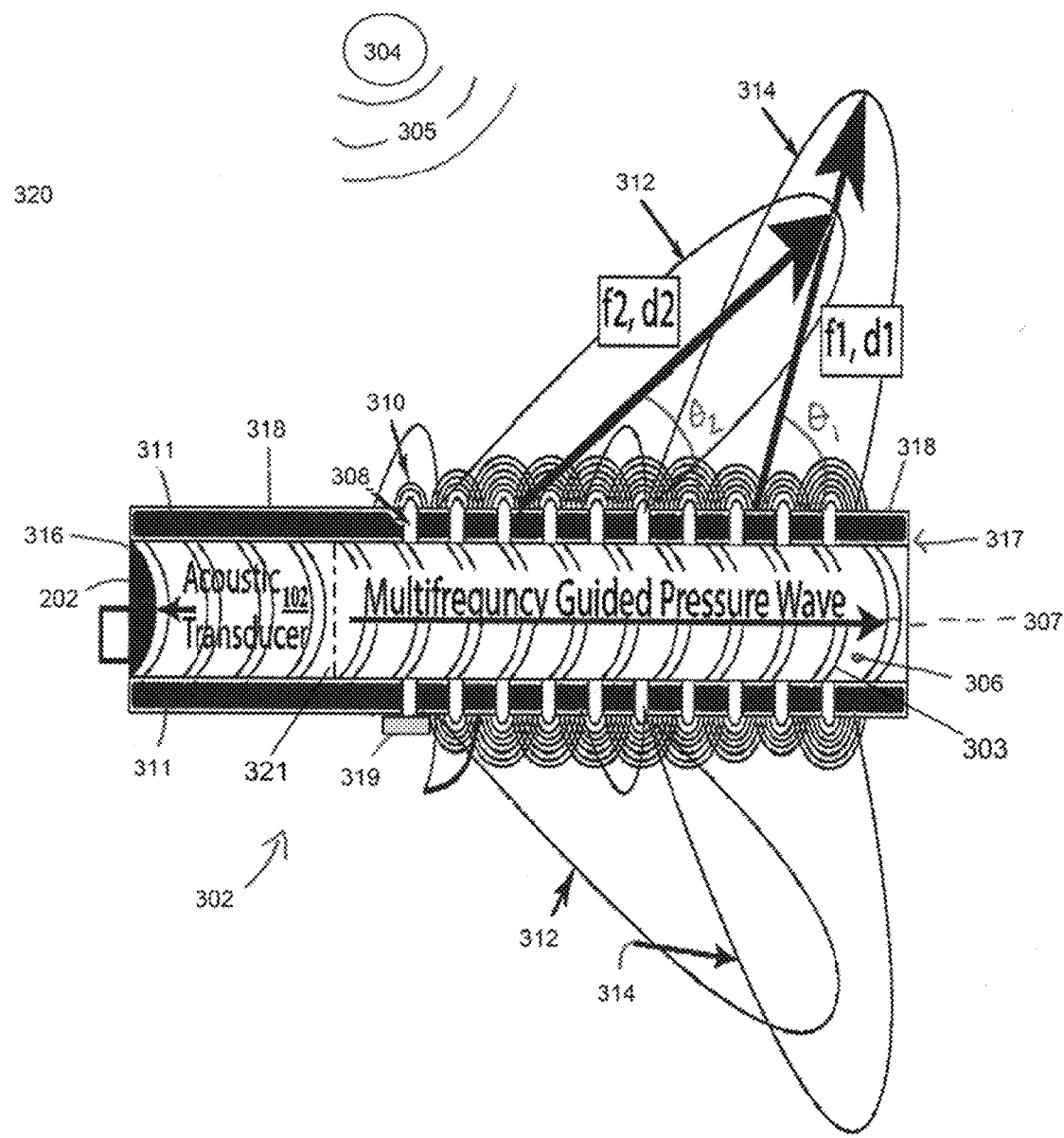
FIG. 3A is a schematic diagram of an acoustic-leaky wave antenna in accordance with the present disclosure.

FIG. 3A is a schematic diagram illustrating an acoustic leaky-wave antenna (LWA) 302 in accordance with the present disclosure. The LWA 302 includes a first end 316, second end 317, and at least one waveguide wall 311. The waveguide wall defines a waveguide cavity 306 to be filled with a waveguide fluid that acts as the LWA's waveguide. The waveguide wall includes an external surface 318.

The LWA 302 may use a frequency dependent angular dispersion relation to simultaneously collect data from multiple angles with a single transducer 202 via a broadband source pulse 305. According to an exemplary embodiment, the pulse 305 may originate from a source 304.

According to another exemplary embodiment, the LWA 302 includes a plurality of periodically structured subwavelength output acoustic ports, also called acoustic windows 308. According to an exemplary embodiment, the windows 308 are configured as any of grooves, open cuts, and apertures. According to an exemplary embodiment, the windows 308 are located on an external surface 318 of the waveguide wall 311 and extend from the external surface 318 to the waveguide cavity 306. The waveguide cavity 306 is designed to a specific aperture, 321. According to another exemplary embodiment, the aperture 321 is a diameter. The longitudinal structure may be one of a cylindrical structure, a rectangular structure, and any structure suitable as determined by those skilled in the art. The windows 308 are engineered to exhibit acoustic-elastic properties with respect to water to allow leakage of the acoustic wave as it propagates along the waveguide axis 307. The windows 308 coherently interact with the guided wave 303 and result in frequency dependent leakage of the guided energy through leaking wavelettes 310 into the surrounding medium 320. According to an exemplary embodiment, the surrounding medium is a fluid medium. The coherent addition of leaking radiation results in a propagating wave $f_n$ with a frequency dependent direction, for example the propagating wave 312 ($f_2$) and the propagating wave 314 ($f_1$). The angle of the propagating wave is denoted by $\theta_2$ and $\theta_1$ respectively, and defined as angle between the direction of the propagating acoustic waves outside, the waveguide and a waveguide axis line 307 parallel to and along the length of the LWA 302.

Figure 3B:
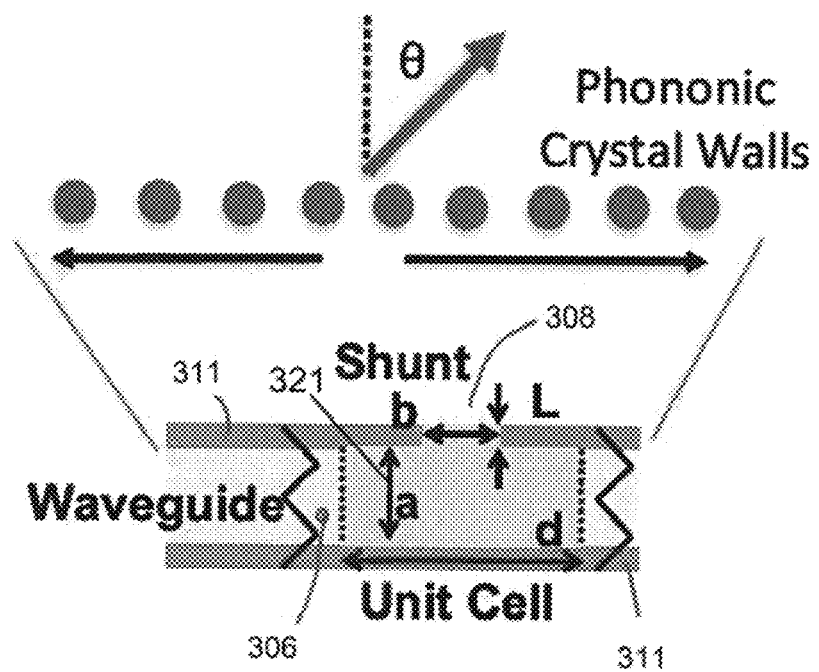
FIG. 3B is a close up schematic diagram of an acoustic-leaky wave antenna in accordance with the present disclosure.

With reference to FIG. 3B, the fluid filled waveguide cavity 306 with waveguide wall/sidewalls 311 is patterned with a plurality of windows 308. The windows 308 are defined by dimensions b, the open distance of the window, and L, the thickness of the waveguide wall 311. According to another exemplary embodiment, a fluid is present in the windows 308. According to, an exemplary embodiment, the fluid in the waveguide cavity 306, windows 308, and fluid medium 320 is the same fluid. In other exemplary embodiments, the fluid in the waveguide cavity 306 and windows 308 is different than the surrounding fluid medium 320. A membrane 319 may be placed across the open windows 308 to prevent the exchange of fluid between the fluid environment 320 and waveguide cavity 306.

The windows 308 are scaled in size with respect to a characteristic wavelength in the fluid background. A typical largest length L would be [wavelength]/10. This ensures that the size of the port is very subwavelength. For example of a 1 kHz characteristic operating frequency in water the wavelength is 1.5 meters. In this example, the feature size of the window could be up to 150 mm. For higher frequencies, this scales linearly. As such, an upper bound on the window size at 10 kHz would be 15 mm. In previous air based experiments port designs have included an upper bound closer to a [wavelength]/100, yielding 400 micron ports in an air background. This, typical window size in water at 10 kHz would be closer to 2 mm than 100 microns.

The physics behind the wave directionally is generally described as follows for an acoustic traveling wave antenna with sub wavelength radiating windows. The radiating windows present a finite barrier through which acoustic waves can be emitted into the surrounding fluid. The window can be an opening through which the acoustic energy passes through. The fluid in the window 308 behaves as a vibrating acoustic mass, driven by acoustic pressure generated in the fluid filled waveguide cavity 306. The windows 308 couple energy. The window 308 changes the waveguide (iv) wall impedance boundary conditions. The wave boundary condition, in turn, changes the wave speed ($c_{wg}$) in the LWA whereas $c_{wg} \neq c_{fluid}$. The energy then refracts as Snell's law in Equation 1.

$$\sin(\theta_s) = \frac{c_{fluid}}{c_{wg}} \qquad \text{Equation 1}$$

In transmitting mode, the sound is emitted by a source inside the waveguide. The sound is allowed to leak out and create a propagating wave that propagates an angle related to the frequency of the wave, this phenomena is known as frequency scanning.

However, it is noted that water has a much higher density and bulk modulus than air. Aqueous fluids, like water, also have a much higher, acoustical impedance than that of air. When the impedance of the fluid environment is similar to that of the materials of the waveguide walls the walls appear acoustically non-rigid in the fluid environment. This creates unwanted leakage of sound and coupling to elastic wall polarization as well as changes in phase speed inside the waveguide. Furthermore, a traditional LWA in a water environment will exhibit coupling to both dilatation and shear polarizations in the elastic structure creating interference in the leaked wave.

In order for a LWA to work in a fluid environment the waveguide walls must be engineered to selectively leak waves and control the impedance matching between the walls and fluid filled waveguide. The engineering aspect can be accomplished one of two ways. One way is to utilize elastic band gap materials to approximate an acoustically rigid boundary. Another way is to utilize an effective meta-fluid boundary wall. An example of which, is a material with one of an anisotropic stiffness tensor, mass tensor, and a combination of the two. A further example is a material with an orthotropic stiffness. Both are used to limit mode conversion to a single polarization type (e.g. one of dilatation and shear).

In accordance with another aspect of the present disclosure, an acoustic leaky wave antenna uses acoustic band gap material to approximate a rigid boundary. According to an exemplary embodiment, an elastic photonic crystal lattice that features a complete band gap for both elastic polarizations over the operational band gap may be used in the waveguide walls. In accordance with an exemplary embodiment, the same acoustic shunt and window designs as used in airborne leaky-wave antennas and as illustrated in FIG. 3, may be functionalized in water. In another exemplary embodiment, the LWA may be a continuous in material without shunts, and rather acoustic windows are tuned into the lattice structure by selective implantation of resonators in the lattice.

Acoustic metamaterials are a class of materials that use subwavelength structures to achieve effective bulk properties under acoustic excitation. Generally, metamaterials may be designed to diffuse away any frequency. However, it is important to limit the frequencies diffused by the metamaterials so that only the desired waves are leaked and propagated. There may exist a band of frequencies where no sound is propagated. The band gaps results from a geometric design in which one of the effective parameters (one of density and modulus) is positive, while the other is negative. The resulting wavenumber is then imaginary and does not propagate through the waveguide and radiate into the surrounding area. Thus, the metamaterial is designed for a certain operational frequency band. The waveguide aperture 321 is designed such that for the target operational band of frequencies the phase speed in the waveguide exceeds the sound speed in the surrounding fluid, in which case the wave is able to leak into the surrounding fluid environment according to Equation 1. In the aspect of the present disclosure where band gaps are used to approximate a rigid boundary in the waveguide walls, the band of frequencies where the band gaps, exist must coincide with the band of frequencies where the phase speed in the waveguide exceeds the sound speed in the surrounding fluid.

Figure 4:
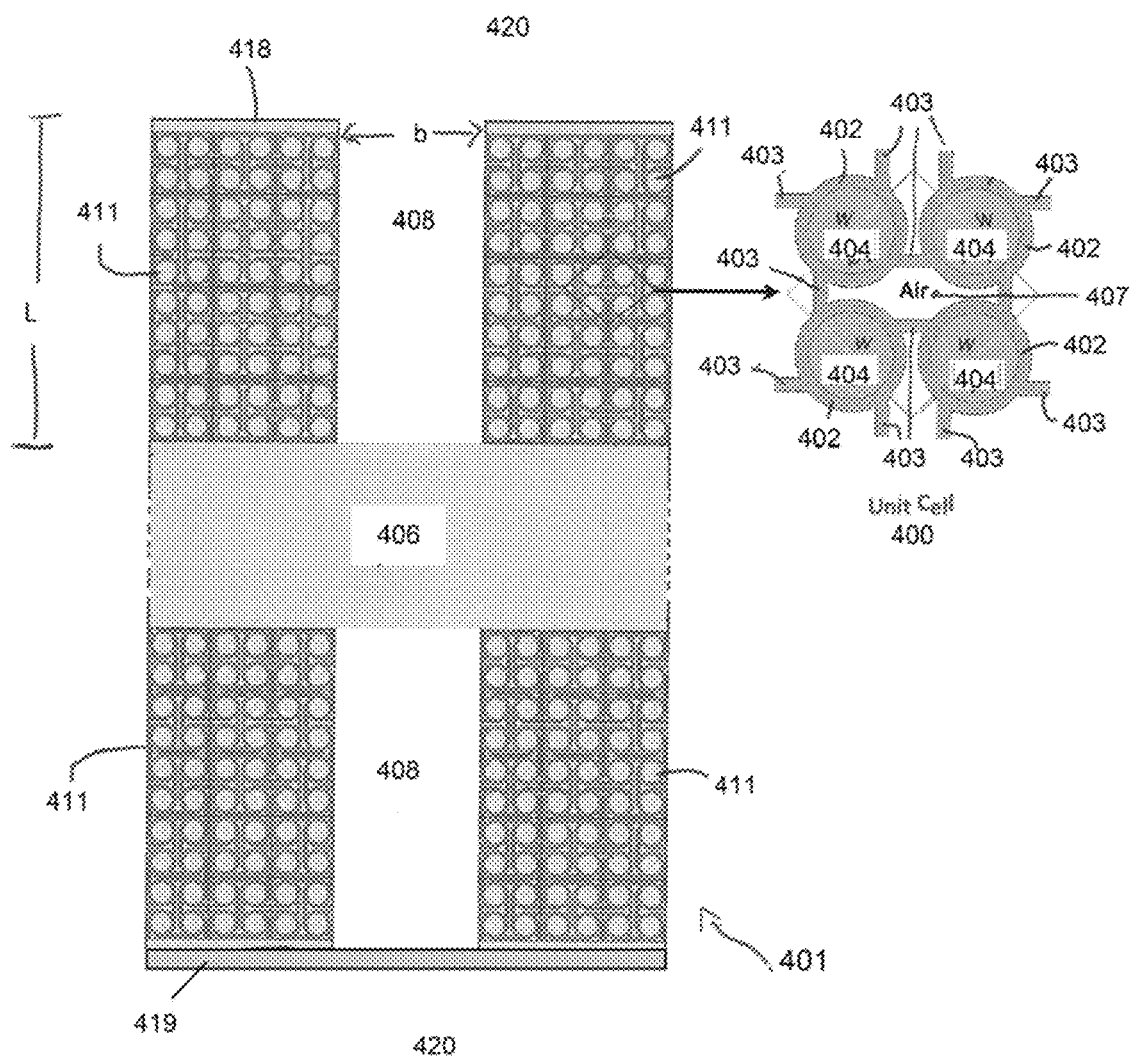
FIG. 4 is schematic cross-sectional view of an acoustic-leaky wave antenna in accordance with the present disclosure.

A cross-section of a leaky-wave antenna using a band gap material as a waveguide wall 411 is shown in FIG. 4. It is to be appreciated that any acoustic band gap material may be used, although shown in this exemplary embodiment is a phononic crystal. The leaky-wave antenna 401 includes waveguide walls 411, having thickness L, that defines a waveguide cavity 406 having a waveguide volume that is adapted to be filled with a waveguide fluid. The waveguide wall 411 includes one of apertures and windows 408 that extend from an outer surface 418 of the waveguide wall 411 to the waveguide cavity 406. The windows 408 have an opening of dimension b. According to an exemplary embodiment, the waveguide wall 411 includes at least one aperture that invites fluid from the fluid environment into the waveguide cavity. According to an another exemplary embodiment, the fluid filled waveguide cavity 406 and windows 408 are sealed with a membrane 419 such that the LWA 401 will not exchange fluid with the fluid environment 420. In these exemplary embodiments, fluid is filled into the waveguide cavity 406 and open windows 408 prior to sealing the antenna with a membrane. In other exemplary embodiments, a closed LWA includes at least one aperture that allows the volume defined by the waveguide walls 411 to be filled with the fluid from the fluid environment 420.

With continued reference to exemplary embodiment FIG. 4, the band gap material is an anti-tetrachiral phononic crystal lattice. This is an auxetic material (possesses a negative Poisson's ratio) that exhibits very slow elastic wave speeds with respect to water. The speed is approximately 1/10 that of water when plastic is used to form the lattice, but ultimately depends of the materials being used. The waveguide wall 411 is made by tiling a plurality of microstructure unit cells 400. In describing the unit cell in two dimensions for the anti-tetrachiral lattice, each cell 400 is made of four circular rings 402 connected by twelve tangent ligaments 403. In some embodiments, the lattice material is an ABS plastic. Tuning the geometry of the anti-tetrachiral lattice, such as introducing inclusions 404, produces a board complete band gap that prevents mode coupling. Disposed in the center of the unit cell 400 is a gap material with high acoustic-impedance-contrast compared to the matrix material 403, an example of such a material is an air gap 407. The high acoustic impedance contrast interface confines the elastic vibrations in the lattice to primarily exist in the matrix material 402 and 403. The low wave speed places the band gap in a frequency band that facilitates subwavelength windows 408. Thus, the metamaterial anti-tetrachiral lattice band gap performs as an acoustically rigid wall when coupled to water. The unit cell structure 400 has geometrically tunable mechanical properties. Formation of the band gap structure is not limited to the anti-tetrachiral geometry. Other periodic sub-wavelength geometries which lead to elasto-acoustic band gaps produce the same 'effectively ridged' acoustic boundary over a finite bandwidth.

The band structure in metamaterials can generally be modified by incorporating tunable local resonators. In the exemplary embodiment of FIG. 4, tunable local resonators 404 in the circular rings 402 of a unit cell 400. The number, placement, and properties of the resonators can be designed to open, shift, and enlarge the band gaps. According to an exemplary embodiment, the resonators are tungsten. Other modifiers are also applicable when high impedance contrast exists. Examples could include high density materials such as lead, iron and iron alloys, copper and copper alloys, uranium and its alloys, other dense noble metals such as gold and platinum, and low-density materials such as air.

In using orthotropic stiffness to control mode conversion, that is to have different elastic properties in at least two planes each perpendicular to each other, an acoustic field is leaked through orthotropic walls that are fully elastic. Generally, when sound travels in a material and hits an interface at an angle some of the energy can cause movement in the transverse direction to start a shear (transverse) wave. Mode conversion occurs when an elasto-acoustic wave traveling at an angle that is not incident to an interface, meets an interface between materials having different elastic wave impedances. The stiffness tensor of a material is designed to optimize the proper beam pattern as a function of frequency, see Equation 2 for an example of an orthotropic stiffness tensor. The stiffness tensor is generally dispersive with frequency such that it produces different phase speeds in the waveguide at different frequencies. The elastic dispersion can be engineered using one of geometric structuring, dispersive materials, and combinations of both. As the coupling with the orthotropic wall changes direction with frequency, the angularly dependent stiffness tensor compensates to control the mode conversion. According to an exemplary embodiment, an orthotropic stiffness tensor can be approximated by a one of lattice and superlattice of stacked isotropic materials. In another exemplary embodiment, the thickness of the radiating portion of the orthotropic wall is modulated along the waveguide propagation direction.

$$\begin{bmatrix} \sigma xx \\ \sigma yy \\ \sigma zz \\ \sigma yz \\ \sigma xz \\ \sigma xy \end{bmatrix} = \begin{bmatrix} c11 & c12 & c13 & 0 & 0 & 0 \\ c12 & c11 & c13 & 0 & 0 & 0 \\ c13 & c13 & c33 & 0 & 0 & 0 \\ 0 & 0 & 0 & c44 & 0 & 0 \\ 0 & 0 & 0 & 0 & c44 & 0 \\ 0 & 0 & 0 & 0 & 0 & c66 \end{bmatrix} \begin{bmatrix} \epsilon xx \\ \epsilon yy \\ \epsilon zz \\ 2\epsilon\epsilon yz \\ 2\epsilon xz \\ 2\epsilon xy \end{bmatrix}$$ (Equation 2)

Figure 5:
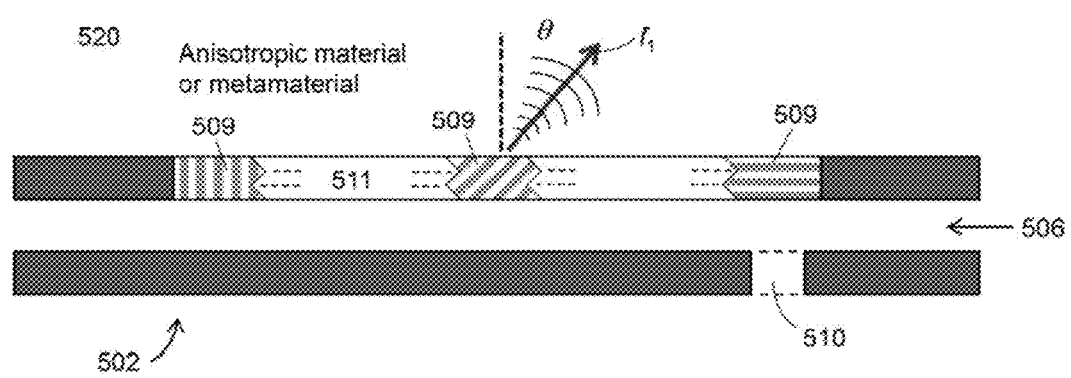
FIG. 5 is a schematic diagram of an acoustic-leaky wave antenna in accordance with the present disclosure.

According to an exemplary embodiment, with reference to FIG. 5 shown is a LWA 502 including a fluid filled waveguide cavity 506 defined by at least one waveguide wall 511. Here, the wave guide wall is an anisotropic material, either one of a composite material, a metamaterial, and combinations of both. These walls may be analogized to sediment layers 509 stacked on top of each other, where each component layer may have one of isotropic stiffness and anisotropic stiffness. The orientation of the principle direction of the anisotropic stiffness tensor, depicted as different stack orientations 509, may be in any direction necessary to properly control the mode conversion. This also helps control and tune the impedance per unit length. In an exemplary embodiment, the orientation of the principle direction may change along the length of the waveguide wall 511. In other exemplary embodiments, the orientation remains constant. Thus, soundwave $f_1$ is engineered to be projected out of the LWA 502 at a particular angle θ. Some examples of these materials include but are not limited to, fiber glass and carbon fiber. In some embodiments, the waveguide wall 511 itself is structurally continuous, meaning there are no shunts and periodic apertures present in the waveguide wall 511.

According to an exemplary embodiment, the fluid filled waveguide cavity 506 is sealed such that the LWA will not exchange fluid with the fluid environment/medium 520. In other exemplary embodiments, the LWA 502 includes a fluid aperture 510 that allows the waveguide cavity 506 to be filled with fluid from the fluid environment 520.

The anisotropic waveguide material is not necessary for a LWA in air, as the impedance per unit length between the waveguide wall and air is very large. However, in a fluid environment the impedance difference between the waveguide wall and surrounding fluid medium is not as large. Thus, the material selection becomes important.

In order to achieve broadband directionality of leaked acoustic waves, the waveguide wall must have a dispersive impedance as a function of frequency. The dispersion changes the phase speed in the waveguide, changing the radiation angle in accordance with Equation 2. According to an exemplary embodiment, the waveguide wall material is a combination of stacked, composite, and orthotropic elastic materials. If the feature sizes of the stacked and composite materials are deeply subwavelength, the composite material will have a static stiffness tensor, and hence static dispersion, assuming a non-dispersive material. However, dispersive materials may be used as components in one of a deeply-sub wavelength stack and a deeply-subwavelength composite structure to introduce the requisite dispersion. In other exemplary embodiments, the dispersion is created by arranging the stacked, composite and orthotropic elastic materials into a superlattice.

Figure 6:
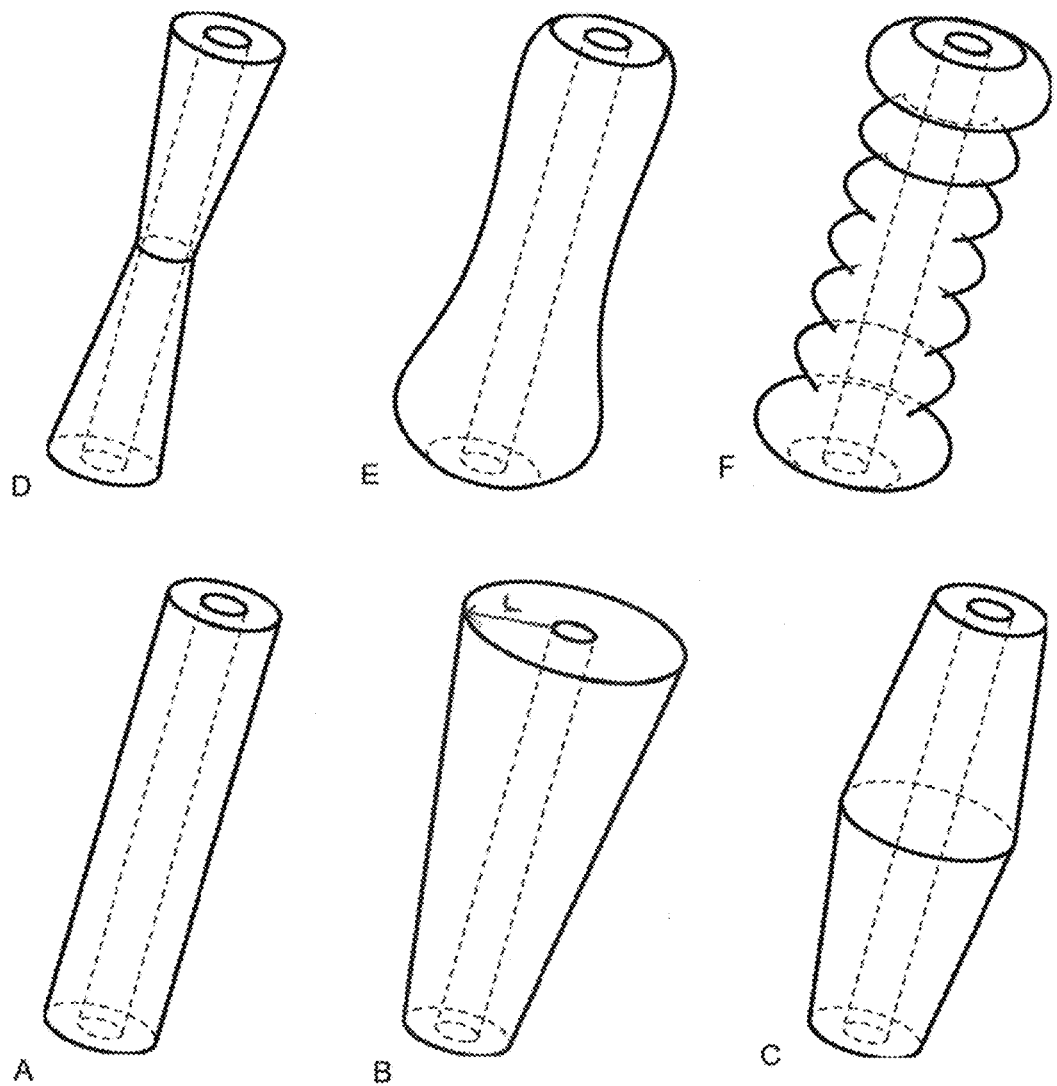
FIG. 6 is a schematic diagram illustrating side wall shapes of a LWA in accordance with the present disclosure.

In accordance with another aspect of the present disclosure, with reference to FIG. 6, the shape of the waveguide walls (sidewalls) may be modified to enhance the operation of the LWA by reducing the side lobes. The sidewall shapes are shown over the full length of the radiating surface of the LWA. Side lobes are the local maxima of the far field radiation pattern that are not the main lobe and propagate in different directions from the main lobe. Thus, it is desirable to have low side lobes for a more directed beam pattern. The side-lobes of the radiated pressure field in water are controlled by varying the waveguide wall thickness. In some cases, where the leaky wave antenna wall has a radius r, tapering the side walls, as shown in FIG. 6 B-E reduces the side lobes.

Figure 7:
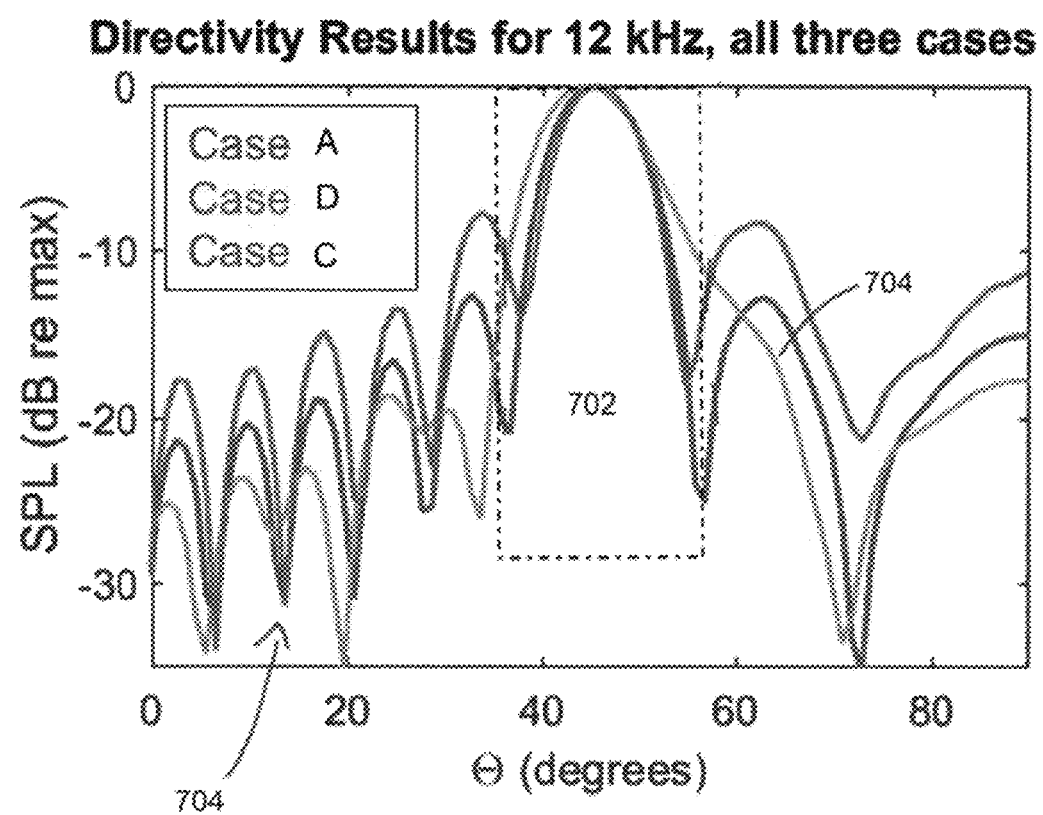
FIG. 7 is a graph illustrating side lobes with respect to waveguide wall shape in accordance with the present disclosure.

Side lobe reduction by varying the thickness of the waveguide wall is shown in FIG. 7. In general, main beams 702 are surrounded by side lobes 704. In case A, corresponding to a constant outer radius FIG. 6A, the main beam is shown surrounded by side lobes. In case Cs corresponding to a 30% radius increase at the midpoint and illustrated in FIG. 6C, the magnitude of the side lobes 704 show an increase when compared to case A. In Case D, corresponding to a 30% decrease in radius at the midpoint and illustrated in FIG. 6D, the presence of side obes 704 are significantly reduced.

Figure 8:
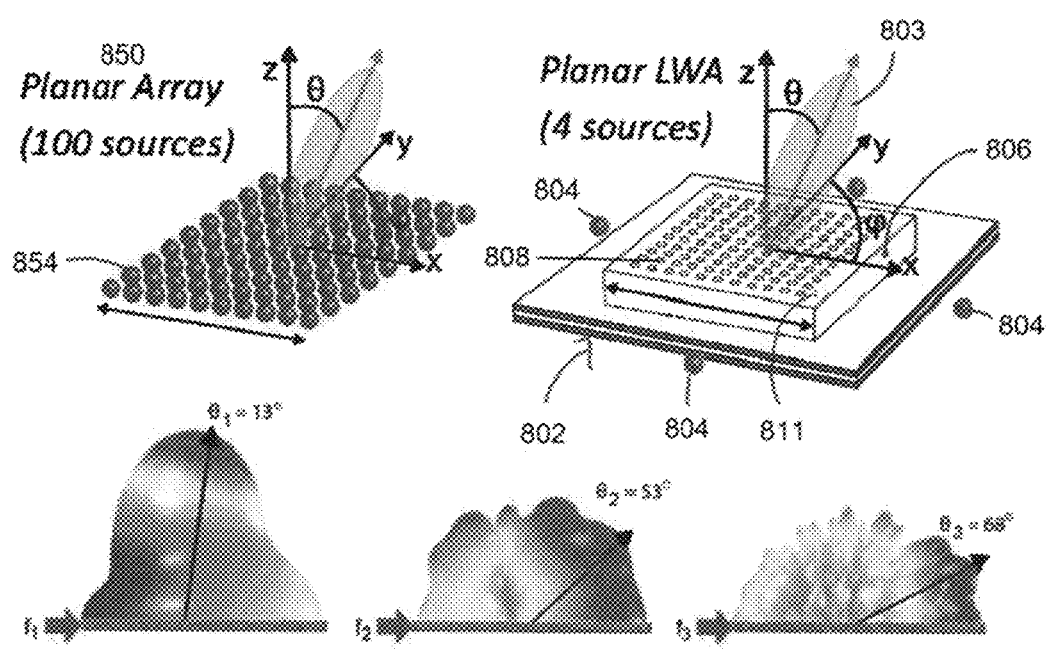
FIG. 8 is a schematic diagram of a planer acoustic-leaky wave antenna in accordance with the present disclosure.

In accordance with another aspect of the present, disclosure and with reference to FIG. 8, a LWA 802 includes a waveguide cavity 806 defined by waveguide wall 811 extended into a planar aperture. According to an exemplary embodiment, the LWA 802 includes a plurality of windows 808. According to another exemplary embodiment, the DNA 802 includes one of four sensors, four sources 804, and a combination of sensors and sources disposed at ends of the LANA 802 to achieve beam forming 803 in three dimensions, x, y, and z. In this way there is a large power savings from the reduction of powered elements by two orders of magnitude when compared to a planer array 850 of many sources 854.

Figure 9A:
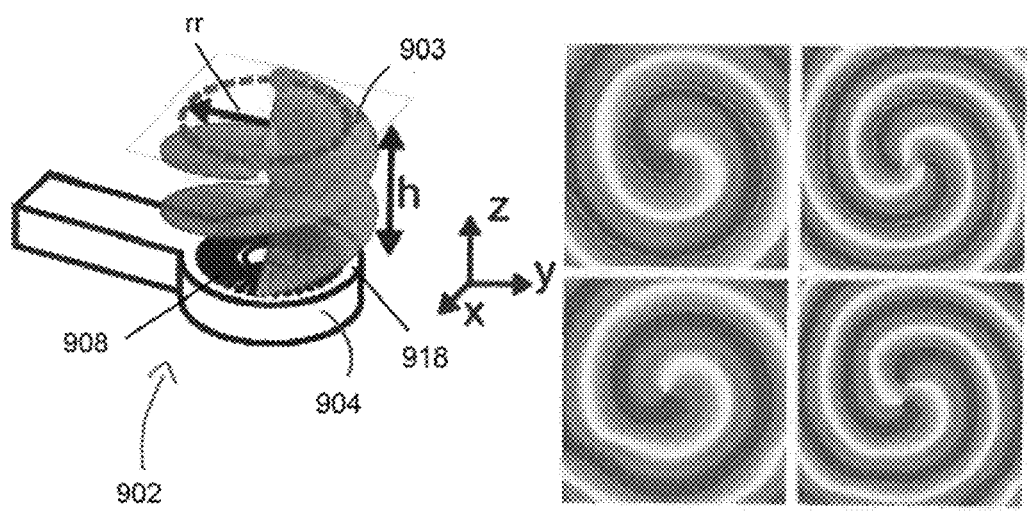
FIG. 9A is a schematic diagram of a ring acoustic-leaky wave at antenna in accordance with the present disclosure.
Figure 9B:
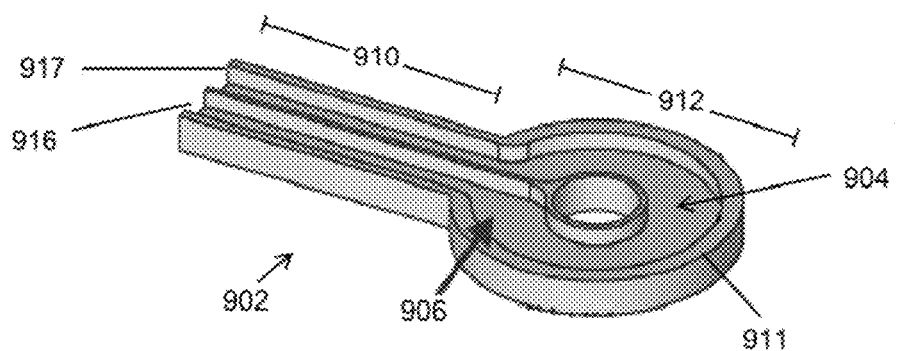
FIG. 9B is an open schematic diagram of a ring acoustic-leaky wave antenna in accordance with the present disclosure; and, FIG. 10 is a schematic diagram of an acoustic leaky-wave antenna in accordance with the present disclosure.

In accordance with another aspect of the present disclosure and with reference to FIG. 9A and FIG. 9B, shown is an underwater LWA 902 in the form of a ring 904 having radius rr, with a first end 916, second end 917, and waveguide walls 911 defining waveguide cavity 906. The LWA 902 includes a longitudinal portion 910, wherein the first end 916 and second end 917 are adjacent to each other, and a circular portion 912 of the waveguide cavity forming a ring shape 904. Windows 908 are disposed on an external surface of the LWA 902. This ring structure creates vortex waves 903 with orthogonal orbital momentum functionality. The angular momentum state L, depends on the frequency, many modes can be encoded in a broadband signal. This increases communication bandwidth of acoustic COMMS devices. Thus, it may produce covert signals as a vortex LWA would be required for decoding the signal. According to an exemplary embodiment, a transducer (not pictured) is disposed at one of one and both ends 916 and 917 of the LWA 902.

Figure 10:
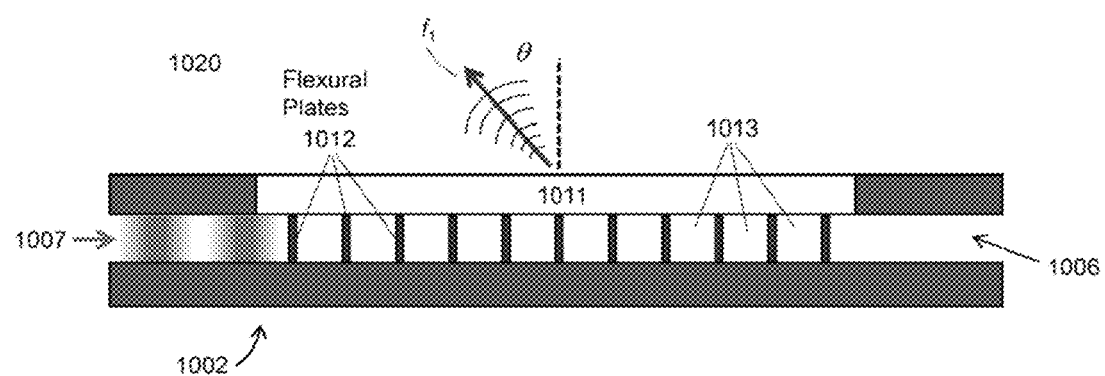

In accordance with another aspect of the present disclosure and with reference to FIG. 10, a LWA 1002 includes flexural elastic plates 1012. LWA 1002 includes a fluid filled waveguide cavity 1006 defined by at least one waveguide wall 1011. Here, the waveguide wall 1011 is one of an anisotropic material, a composite material, a metamaterial, and a band gap material with acoustic windows. A periodic lattice of thin flexural elastic plates 1012 is inserted into the waveguide cavity 1006. The elastic plates 1012 are oriented in order to transect the waveguide in the direction of wave propagation, forming a complete seal preventing fluid from interchanging between the sub-cavities 1013 formed between the plates. The thickness of the flexural plates is much less than the wavelength in the waveguide such that the pressure field can cause the elastic plates to flex in the direction of wave propagation. The lattice of flexural elastic plates 1012 creates a frequency band exhibiting negative effective density in the waveguide, which enables the possibility of negative refraction through the waveguide wall 1011 at certain frequencies $f_1$. The negative refraction is exemplified by the transmission of waves through the waveguide wall 1011 in the direction opposite to that of propagation 1007 within the waveguide. According to an exemplary embodiment, the fluid in the sub-cavities 1013 can interchange between the exterior fluid environment 1020 through windows in the waveguide wall 1011. In other exemplary embodiments, the fluid is completely sealed within the sub-cavities 1013 between the plates.

The present disclosure has been described with reference to exemplary embodiments. Obviously, modifications and alterations will occur to others upon reading and understanding the preceding detailed description. It is intended that the exemplary embodiment be construed as including all such modifications and alterations insofar as they come within the scope of the appended claims or the equivalents thereof.

What is claimed is:

1. A leaky-wave antenna system comprising:
   an acoustic leaky-wave antenna comprising:
      a first and second end; and
      a waveguide cavity having at least one waveguide wall that defines a waveguide volume, the at least one waveguide wall including one of an anisotropic material and an acoustic band gap material, the acoustic band gap material configured to approximate an acoustically rigid boundary in a fluid environment and the anisotropic material configured to an orthotropic stiffness to control a mode conversion of an input acoustic wave signal; and
   a transducer disposed at one of the first and second end and operationally coupled to the acoustic leaky-wave antenna.

2. The system of claim 1 wherein the acoustic leaky-wave antenna further comprises a waveguide fluid that fills the waveguide volume.

3. The system of claim 2, wherein the acoustic leaky-wave antenna further comprises a plurality of periodically structured sub-wavelength acoustic windows disposed in the waveguide wall and extend from an external surface of the at least one waveguide wall to the waveguide cavity.

4. The system of claim 2 wherein the waveguide fluid is water.

5. The system of claim 2, wherein the acoustic band gap material is a phononic crystal lattice.

6. The system of claim 2, wherein the acoustic band gap material is an anti-tetrachiral lattice structure.

7. The system of claim 1, wherein the transducer is configured to detect a broadband signal collected by the leaky wave antenna.

8. The system of claim 1, wherein the transducer transmits a broadband acoustic wave in the waveguide.

9. The system of claim 1, wherein the leaky-wave antenna transmits an acoustic signal at a frequency dependent angle.

10. A leaky-wave antenna comprising:
    at least one waveguide wall that defines a waveguide cavity having a waveguide volume, the waveguide cavity adapted to be filled with a waveguide fluid, and the at least one waveguide wall includes an acoustic band gap material; and
    a plurality of periodically structured acoustic windows located on an external surface of the waveguide wall, the periodically structured acoustic windows are physical apertures in the waveguide wall extending from the external surface the waveguide wall to the waveguide cavity.

11. The leaky-wave antenna of claim 10, wherein the waveguide fluid fills the waveguide cavity and plurality of periodically structured acoustic windows.

12. The leaky-wave antenna of claim 1, wherein the waveguide fluid is sealed in the leaky-wave antenna.

13. The leaky-wave antenna of claim 11, wherein a membrane is placed over the external surface of the at least one wave guide wall providing a seal for the plurality of acoustic window apertures.

14. The leaky-wave antenna of claim 10, wherein the plurality of periodically structured acoustic windows are configured to interact with an acoustic pulse present in the fluid filled waveguide resulting in a frequency dependent leakage of an acoustic pulse energy into an external fluid medium.

15. The leaky-wave antenna claim 10, wherein the acoustic band gap material is a phononic crystal lattice.

16. The leaky-wave antenna of claim 10, wherein the acoustic band gap material is composed of a plurality of chiral structures.

17. The leaky-wave antenna of claim 10 further comprising:
    a longitudinal portion having a first end adjacent to a second end; and,
    a circular portion, having the waveguide cavity forming a circular shape, wherein the leaky wave antenna is adapted to propagate a vortex acoustic wave.

18. The leaky-wave antenna of claim 10 further comprising a plurality of flexural elastic plates spaced apart periodically along and oriented to transect the waveguide cavity in a direction of wave propagation.

19. A leaky-wave antenna comprising:
    at least one waveguide wall having a continuous external surface that defines a waveguide cavity having a waveguide volume, the waveguide cavity adapted to be filled with a waveguide fluid, the at least one waveguide wall including one of an anisotropic material and metamaterial configured to an orthotropic stiffness to control a mode conversion of an acoustic wave.

20. The leaky-wave antenna of claim 9, wherein the waveguide wall is of a material that allows for an acoustic field leakage through orthotropic walls that are fully elastic.

21. The leaky-wave antenna of claim 19, wherein the anisotropic material is a composite material.

22. The leaky-wave antenna of claim 19, wherein the anisotropic material is a stack of at least one component material wherein the component materials are one of an isotropic and an anisotropic material.

23. The leaky-wave antenna of claim 19, wherein a stiffness tensor of the anisotropic material is designed to optimize a beam pattern as a function of a frequency.

24. The leaky-wave antenna of claim 19, further comprising:
   a longitudinal portion having a first end adjacent to a second end; and,
   a circular portion, having the waveguide cavity forming a circular shape, wherein the leaky wave antenna is adapted to propagate a vortex acoustic wave.

25. The leaky-wave antenna of claim 19, further comprising a plurality of flexural elastic plates spaced apart periodically along and oriented to transect the waveguide cavity in a direction, of wave propagation.

\* \* \* \* \*